United States Patent [19]

Hatakeyama et al.

[11] Patent Number: 4,495,125
[45] Date of Patent: Jan. 22, 1985

[54] METHOD FOR FORMING A SYNTHETIC-RESIN-MADE CONTAINER

[75] Inventors: Yoshiharu Hatakeyama, Tokyo; Kenzo Teshima, Chiba, both of Japan

[73] Assignee: Yoshida Industry Co., Ltd., Tokyo, Japan

[21] Appl. No.: 413,067

[22] Filed: Aug. 30, 1982

[30] Foreign Application Priority Data

May 13, 1982 [JP] Japan ................................. 57-79243

[51] Int. Cl.³ .......................... B29D 3/00; B29D 9/00
[52] U.S. Cl. .................................... 264/132; 264/247;
264/250; 264/263; 264/266; 264/269
[58] Field of Search ............... 264/132, 246, 247, 250,
264/263, 269, 266

[56] References Cited

U.S. PATENT DOCUMENTS 2,200,042  5/1940  Salz ................................... 264/269 X
2,931,119  4/1960  Gits et al. ......................... 264/132 X
3,122,598  2/1964  Berger ............................. 264/132 X
3,270,101  8/1966  Jardine et al. ................... 264/247 X

FOREIGN PATENT DOCUMENTS 952674   8/1974  Canada ................................. 264/247
1193829  11/1959  France ................................. 264/247
1255820  10/1961  France ................................. 264/247
1434565   5/1976  United Kingdom ................ 264/263

Primary Examiner—Jan Silbaugh
Attorney, Agent, or Firm—Wenderoth, Lind & Ponack

[57] ABSTRACT

A synthetic-resin-made container having ornamentation is formed by forming a flexible and ornamented tubular member and inserting it into an outer sleeve, disposing the sleeve in a molding die to define an annular space inside the tubular member, and injecting molten resin into the space and then solidifying the resin to form an inner sleeve which is fused with the outer sleeve at both ends thereof, thereby hermetically sealing the tubular member therebetween.

4 Claims, 8 Drawing Figures

METHOD FOR FORMING A SYNTHETIC-RESIN-MADE CONTAINER

BACKGROUND OF THE INVENTION

The present invention relates to a method of forming a synthetic-resin-made container, and more particularly to a method of forming a container suitable for use with eau de Cologne, perfume or like cosmetics.

Many containers for cosmetics are usually ornamented or decorated over their surfaces with a metallic luster or various designs, for the purpose of creating an impression that their contents are high-grade, or for some other purposes. A conventional method for providing such ornaments is to plate or galvanize a premolded container or to transfer ornaments onto the container by means of a heat-transfer film which includes a mold release layer, a plated metal film and a heat-sensitive adhesive layer formed in this order. However, the former method increases the manufacturing costs of the container due to a troublesome and time-consuming plating process. Also, it is difficult with such method to provide the ornament in a limited area of the container surface or to ornament the surface with a complicated design. On the other hand, if the latter method is employed, transfer of the ornament from the film to the container surface is difficult if the container has a complex shape which is sometimes required by the user.

Furthermore, in both methods, it has been necessary to provide a protective layer over the ornamented surface. Otherwise, the ornament is likely to fade or come off when stained with perfume, eau de Cologne or the like containing alcohol. Such protective layer further increases the manufacturing costs. Thus, the conventional methods are defective and not preferable for ornamenting or decorating a container particularly for cosmetics.

Therefore, it is an object of the present invention to provide a method for forming a synthetic-resin-made container, according to which a fine ornament or decoration may be imparted to the container very easily and at low costs.

Another object of the present invention is to provide a method of the type set forth above which enables the manufacturer to give any desired ornament to the container regardless of the shape or configuration of the latter.

A further object of the present invention is to provide such a method whereby the ornament can be maintained semipermanently without any protective layer on the ornamented surface.

SUMMARY OF THE INVENTION

According to the present invention, a method for forming a synthetic-resin-made container starts with the step of forming a relatively thin tubular member of a soft material and having an ornamentation or decoration at least on its outer surface. The tubular member is inserted into a transparent or semitransparent synthetic-resin-made outer sleeve opened at least at one end thereof. The outer sleeve and the tubular member are disposed in a die for injection molding to define an annular or cylindrical of the outer sleeve and the tubular member. Injected into the space is molten resin which is fusible with the outer sleeve. The molten resin is then solidified to form an inner sleeve which is consequently fused together with the outer sleeve at both ends thereof, thereby hermetically sealing the tubular member therebetween.

Preferably, the tubular member is formed of a thermoplastic resin and, more preferably, formed 0.3 to 0.5 mm thick by means of extrusion molding.

A container formed by the present method therefore comprises the tubular member having the ornament at least on its outer surface, the transparent or semi-transparent outer sleeve of synthetic resin closely fitted on the outside of the tubular member and the synthetic-resin-made inner sleeve disposed inside of the tubular member. The outer and inner sleeves are fused together at both ends thereof, thereby hermetically sealing the tubular member therebetween.

Other objects and features of the present invention will become apparent from the detailed description of preferred embodiments thereof when taken in conjunction with the accompanying drawings, in which:

DETAILED DESCRIPTION OF THE INVENTION

Figure 1:
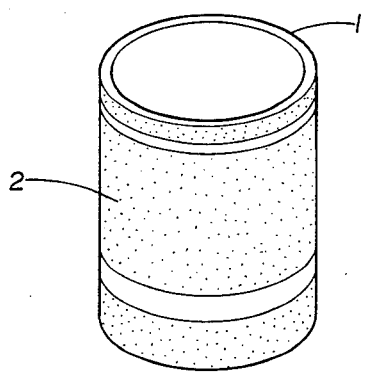
FIG. 1 is a perspective view showing a tubular member of a synthetic-resin-made container employed according to an embodiment of the present invention.

Referring now to FIG. 1 of the drawings, there is shown a tubular member 1 employed in the present invention for imparting an ornamental appearance to a container. The manufacture or formation of the synthetic-resin-made container according to the present invention starts with the production of such open-ended tubular member 1 which is formed relatively thin using a soft material so as to be flexible. The soft material forming the tubular member 1 may be a thermoplastic resin selected from the group consisting of polyolefin, polyamid, PVC, polyethylene terephthalate and methyl penten resins, and if such resin is employed, the tubular member 1 may be formed by extrusion molding to a thickness preferably of 0.3 to 0.5 mm. The outer surface 2 of the tubular member 1 is ornamented or decorated with a desired design, which ornamentation or decoration may be performed by use of a heat-transfer film or by printing. Alternatively, the tubular member 1 may be given the ornamentation or decoration at the time of its production. For example, a pearl essence of a mica or titanium group may be mixed into the resin from which the tubular member 1 is formed, thereby giving a pearly luster to the outer surface 2.

The tubular member 1 thus formed is inserted into an outer sleeve or cylinder 3 formed of a transparent or semitransparent synthetic resin and opened at the lower end to permit such insertion of the tube 1. It is important that the tubular member 1 need not be closely fitted into the outer sleeve 3 and that the existence of a gap or clearance between the outer surface 2 of the tube 1 and an inner surface of the sleeve 3 is permissible at this stage. An advantage thereof will be described later.

Figure 2:
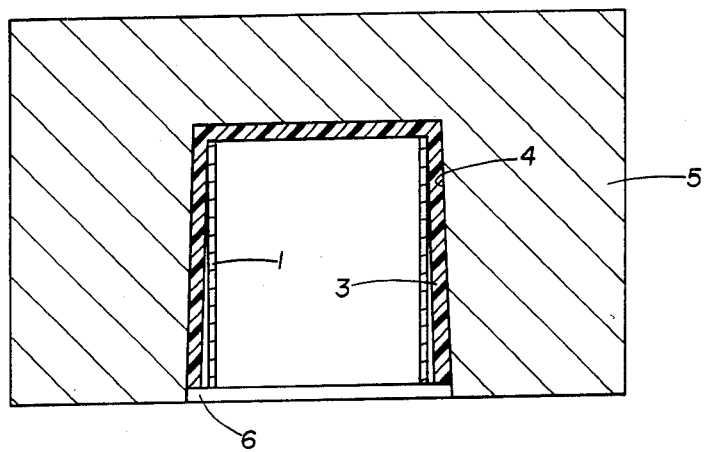
FIGS. 2 to 4 are sectional views for explaining a method for forming the container according to the present invention, illustrating different steps in series.
Figure 3:
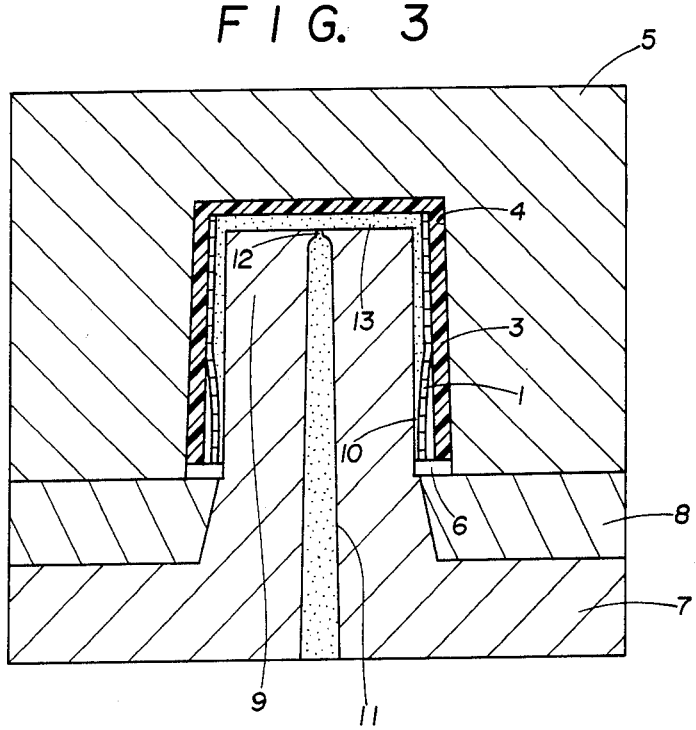

The outer sleeve 3, as well as the tube 1, is then inserted into a cavity 4 of a female die 5 for injection molding, as shown in FIG. 2. The cavity 4 is so arranged that a lower circular space 6 is defined below the sleeve 3 and tube 1 when these are completely inserted in the cavity 4. Thereafter, the female die 5 is combined with a male die 7 and a stripper plate 8 to close the lower open end of the cavity 4, as shown in FIG. 3. The male die 7 has a core 9 which defines a loop-like space 10 inside of the tube 1 and outer sleeve 3.

Figure 4:
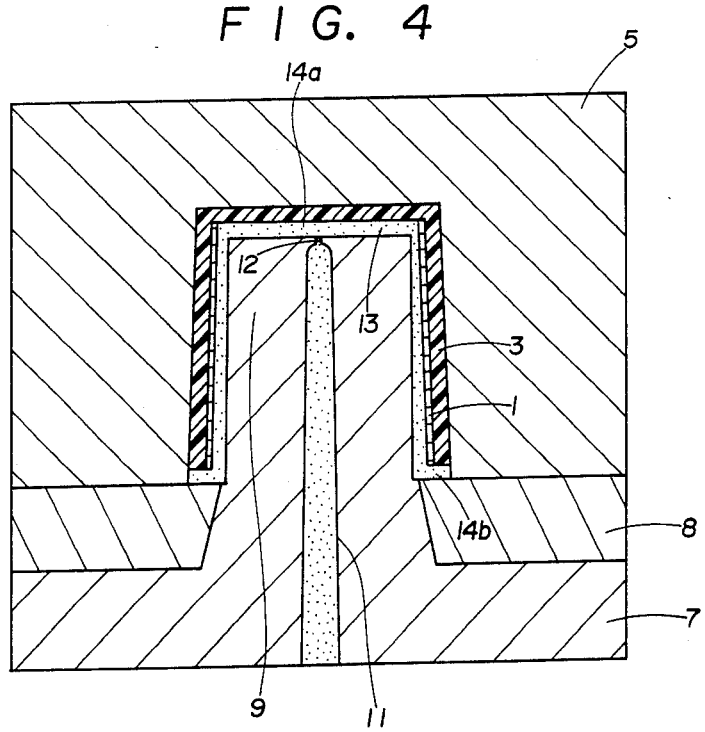

There are provided a passage 11 in the male die 7 and an injection port 12 at the top of the core 9, through which molten resin, as depicted by reference numeral 13, is injected into the space 10 to form an inner sleeve or cylinder. At this time, the tubular member 1 is pressed against the inner surface of the outer sleeve 3 by the heat and pressure of the molten resin 13 flowing down on the inside of the tubular member 1 and is brought into close contact with the outer sleeve 3. The resin 13 thus injected into the space 10 at last flows down to the lower end of the tube 1 and thence into the lower space 6 to reach the lower end portion of the outer sleeve 3, as shown in FIG. 4.

The resin 13 is selected from such synthetic resins that can be fused together with the resin forming the outer sleeve 3. Therefore, the inner cylinder 14 formed by the resin 13 is fused at its upper and lower end portions 14a and 14b together with the outer sleeve 3, whereby the tubular member 1 is hermetically sealed between the outer and inner sleeves 3 and 14. Although the tubular member 1 in this embodiment is made of synthetic resin, it is not essential nor necessary that the inner sleeve 14 is fused together with the tubular member 1. The resin 13 forming the inner sleeve 14 may be transparent, semi-transparent or opaque, whichcan be selected in relation to a desired ornamental appearance. After the resin 13 is cooled and solidified in the cavity 4 to form the inner sleeve or cylinder 14, the molded product is removed from the cavity 4 by the stripper plate 8.

In the above embodiment, the premolded outer sleeve 3 is, after the insertion of the tube 1, inserted into the cavity 4 of the female die. However, it is also possible, and rather preferable, to employ a rotary-type molding machine (not shown) which makes it possible to continuously carry out molding operations. In case such molding machine is used, the outer sleeve 3 is molded in the cavity 4 and remains therein, the tubular member 1 is inserted into the cavity 4 inside of the outer sleeve 3, and then the female die 5 is rotated or transferred to the position where it will be combined with the male die 7 and the stripper plate 8 for the following process.

Figure 5:
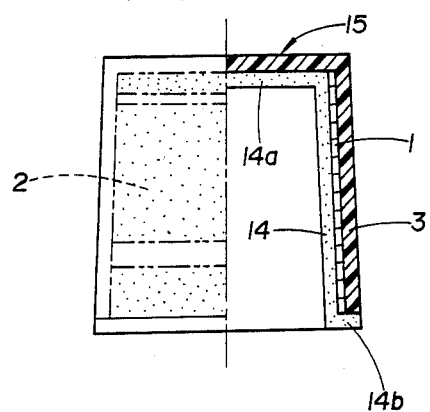
FIG. 5 is a partially sectioned front view showing a synthetic-resin-made container manufactured according to an embodiment of the present invention.

FIG. 5 shows a synthetic-resin-made container, in upside-down position, manufactured by the method according to the above embodiment of the present invention. Reference numeral 15 generally indicates the container which comprises the cylindrical outer sleeve 3, the inner sleeve 14 fused at the upper and lower end portions 14a and 14b with the outer sleeve 3, and the tubular member 1 hermetically sealed between the outer and inner sleeves. The tubular member 1 has the ornament or decoration at its outer surface 2 which is in close contact with the inner surface of the outer sleeve 3 of transparence or semitransparence. Therefore, the ornament or decoration can be clearly seen through the outer sleeve 3 as if the inner surface of the latter was directly ornamented or decorated.

Furthermore, the tubular member 1 sealed by the outer and inner sleeves 3 and 14 is never subjected or exposed to the contents of the container 15, such as perfume, eau de Cologne or the like which tends to corrode or soil the ornament. This means that the attractive appearance of the container can be kept semi-permanently without any protective layer(s) over the ornamented or decorated surface. As has been described, the ornamentation or decoration on the outer surface 2 of the tube 1 may be made by a heat-transfer film or by printing, which permit the manufacturer to freely provide any desirable design including complex-patterned and/or multi-coloured ones. Also, the ornamented or decorated tubular member 1 is sealed during the molding of the container 15, which is believed less troublesome and easier than in the case of ornamenting the container after the molding thereof.

Figure 6:
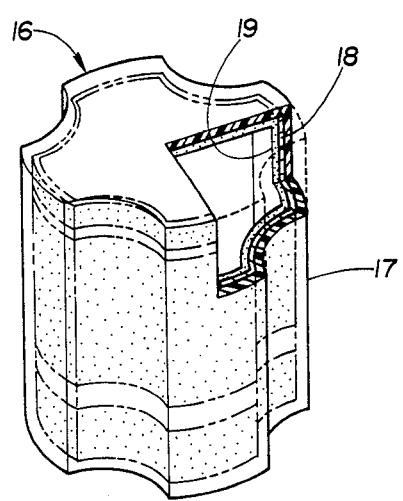
FIG. 6 is a partially sectioned perspective view of another container formed by the present method.

FIG. 6 shows another container 16 manufactured by the above method according to the present invention. Different from the above one, this container 16 is formed to a relatively complicated configuration as sometimes required by the user and/or consumer. By an employment of an ornamented tubular member the present invention makes it possible to provide a desired ornamentation or decoration to the container even if it has such configuration. That is, an ornamented tubular member 18 may be originally formed to the cylindrical shape as shown in FIG. 1 and loosely fitted into an outer sleeve 17. Then, molten resin, which consequently forms an inner tube 19, presses by its heat and pressure the tube 18 against the outer sleeve of complicated shape, whereby the ornamented surface of the tube 18 is brought into close contact with the outer sleeve 17. Thus, there is no difficulty in ornamenting or decorating a container having a complicated shape, as well as a simple cylindrical container.

Figure 7:
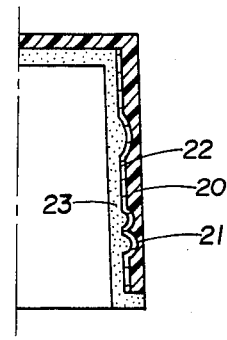
FIGS. 7 and 8 are cross sectional views each showing a part of a synthetic-resin-made container manufactured according to further embodiment of the present invention.

It is also possible to provide a cubic or three-dimensional pattern in the container. Such pattern may be provided by forming uneven portions 21 in the inner surface of an outer sleeve 20 as shown in FIG. 7. A tubular member 22 is pressed against the inner surface including the uneven portions 21 during the molding of an inner sleeve 23 to make the cubic pattern.

Figure 8:
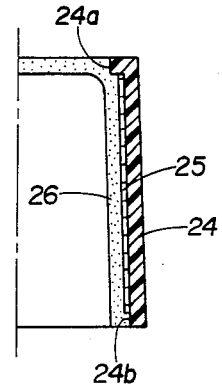

Although in the foregoing embodiments the outer sleeve is opened at its lower end and the inner sleeve extends to cover the lower end portion of the outer sleeve, the end portions of the outer and inner sleeves can be shaped as desired so long as they are fused together to seal therebetween the tubular member during the molding of the inner tube. Accordingly, their configurations can be modified variously. For instance, as shown in FIG. 8, an inner sleeve 26 closes an upper open end of an outer sleeve 24 and the lower end of the outer sleeve 24 extends down past the lower end of a tubular member 25 to the same level as the lower end of the inner sleeve 26. The fusion of the outer sleeve with the inner sleeve can be ensured at the upper and lower ends 24a and 24b of the outer sleeve.

The present invention also serves to improve the impermeability to liquid or gas of the container while successfully imparting ornamentation or decoration thereto. For example, when the tubular member 1 is made of a synthetic resin as in the foregoing embodiments, if the outer and inner sleeves are formed of stylene resin, then permeability to water can be suppressed by forming the tubular member of polyolefin resin, and if polyamid resin is used for the tubular member, then impermeability to gas can be enhanced. Furthermore, by forming the tubular member to have a multilayer structure using the olefin and the polyamid resin, impermeability to both liquid and gas can be improved.

The present invention may be applied to various kinds of synthetic resin containers in which ornamentation thereto is required or desirable, and many modifications and alterations may be made within the spirit of the present invention.

What is claimed is:

1. A method for forming a synthetic-resin-made container, said method comprising:

forming a relatively thin tubular member of soft material and having open opposite first and second ends, and imparting an ornamentation or decoration at least to an outer surface of said tubular member;

forming an outer sleeve of transparent or semitransparent synthetic resin material and having opposite first and second ends, with at least said first end of said outer sleeve being open;

loosely inserting said tubular member into said outer sleeve until said first end of said tubular member comes into contact with said second end of said outer sleeve;

disposing said outer sleeve and said tubular member in an injection molding die, with said second end of said outer sleeve being positioned inwardly of said die, and defining in cooperation with a core of said die a cylindrical space within said tubular member and said outer sleeve, said core having at an inner end thereof adjacent said second end of said outer sleeve an injection port;

injecting through said injection port molten resin which is fusible with said material of said outer sleeve into said cylindrical space, and causing said molten resin to flow from an inner end to an outer end of said cylindrical space, while pressing said tubular member into close contact with an inner surface of said outer sleeve; and solidifying said molten resin to form therefrom an inner sleeve, while fusing together said outer and inner sleeves at respective opposite ends thereof, thereby hermetically sealing said tubular member between said outer and inner sleeves.

2. A method as claimed in claim 1, wherein said tubular member is formed of a thermoplastic resin material.

3. A method as claimed in claim 2, wherein said tubular member is formed 0.3 to 0.5 mm thick by means of extrusion molding.

4. A method as claimed in claim 2, wherein said ornamentation or decoration to said tubular member is imparted to said outer surface thereof by use of a heat-transfer film or by printing.

* * * * *